United States Patent [19]
Tarbet et al.

[11] Patent Number: 5,618,433
[45] Date of Patent: Apr. 8, 1997

[54] PROCESSES FOR SEPARATING AND CONCENTRATING CERTAIN IONS FROM MIXED ION SOLUTIONS USING ION-BINDING LIGANDS BONDED TO MEMBRANES

[75] Inventors: Bryon J. Tarbet, Highland; Ronald L. Bruening, Springville, both of Utah; Anthony J. Di Leo, Westford, Mass.; Philip M. Goddard, New Ipswich, N.H.; Louis M. Scarmoutzos, Andover, Mass.

[73] Assignee: Millipore Corporation, Bedford, Mass.

[21] Appl. No.: 685,432

[22] Filed: Jul. 23, 1996

Related U.S. Application Data

[62] Division of Ser. No. 233,640, Apr. 26, 1994, Pat. No. 5,547,760.

[51] Int. Cl.$^6$ .......................... B01D 11/00; B01D 63/00
[52] U.S. Cl. .......................... 210/634; 210/635; 210/681; 210/651; 210/653; 210/654; 210/502.1; 210/321.6; 210/490
[58] Field of Search .................................... 210/650, 651, 210/653, 654, 634, 490, 500.38, 500.41, 500.36, 500.29, 500.31, 635, 198.2, 502.1, 321.6, 681; 423/DIG. 14

[56] References Cited

U.S. PATENT DOCUMENTS

| | | | |
|---|---|---|---|
| 4,693,985 | 9/1987 | Degen et al. | 210/635 |
| 5,045,190 | 9/1991 | Carbonell et al. | 210/635 |
| 5,470,463 | 11/1995 | Girot et al. | 210/635 |
| 5,474,593 | 12/1995 | Sakurai et al. | 423/DIG. 14 |
| 5,547,760 | 8/1996 | Tarbet et al. | 428/471 |

*Primary Examiner*—Ana Fortuna
*Attorney, Agent, or Firm*—Hamilton, Brook, Smith & Reynolds, P.C.

[57] ABSTRACT

A method for removing, separating, and concentrating certain selected ions from a source solution that may contain larger concentrations of other ions comprises bringing the source solution in contact with a composition comprising an ion-biding ligand covalently bonded to a membrane having hydrophilic surface properties. The ligand portion of the composition has affinity for and forms a complex with the selected ions, thereby removing them from the source solution. The selected ions are then removed from the composition through contact with a much smaller volume of a receiving solution in which the selected ions are either soluble or which has greater affinity for the selected ions than does the ligand portion of the composition, thereby quantitatively stripping the complexed ions from the ligand and recovering them in concentrated form in the receiving solution. The concentrated ions thus removed may be further separated and recovered by known methods. The process is useful in the removal of selected ions, including noble metals and other transition metals from a variety of source solutions such as are encountered in semiconductor, nuclear waste cleanup, metals refining, environmental cleanup, providing ultra high purity fluids, electric power, and other industrial enterprises. The invention is also drawn to the ligand-membrane compositions.

28 Claims, No Drawings

PROCESSES FOR SEPARATING AND CONCENTRATING CERTAIN IONS FROM MIXED ION SOLUTIONS USING ION-BINDING LIGANDS BONDED TO MEMBRANES

This application is a division of Ser. No. 08/233,640 filed Apr. 26, 1994, now U.S. Pat. No. 5,547,760 which is incorporated herein by reference in its entirety.

FIELD OF THE INVENTION

This invention relates to ion-binding ligands covalently bonded to membranes and to a process for removing and concentrating certain selected ions from solutions using the ligand-membrane compositions, wherein such ions may be admixed with other ions present in much higher concentrations. More particularly, the invention relates to ligand-membrane compositions and to a process for removing such ions from an admixture with other ions in a source solution by forming a complex of the selected ions with the ligand-membrane compositions by flowing such solutions through a contacting device containing the ligand-membrane compositions and then breaking the complex of the selected ion from the composition to which such ion has become attached by flowing a receiving liquid in much smaller volume than the volume of solution passed through the contacting device to remove and concentrate the selected ions in solution in the receiving liquid. The concentrated ions thus removed my then be recovered by known methods.

BACKGROUND OF THE INVENTION

Composite membranes of the type utilized in one embodiment of the present invention have been previously described in U.S. Pat. No. 4,618,533 to Steuck. Some of the ion-binding ligands of the types disclosed herein are also known. For example, U.S. Pat. No. 4,952,321 to Bradshaw et al. discloses amine-containing hydrocarbons attached to a solid inorganic support such as silica or silica gel wherein the ligand is bound to the solid inorganic support through a hydrocarbon spacer containing a trialkoxysilane group. U.S. Pat. Nos. 5,071,819 and 5,084,430 to Tarbet et al. disclose sulfur and nitrogen-containing hydrocarbons as ion-binding ligands. U.S. Pat. Nos. 4,959,153 and 5,039,419 to Bradshaw et al. disclose sulfur-containing hydrocarbon ligands. U.S. Pat. Nos. 4,943,375 and 5,179,213 to Bradshaw et al. disclose ion-binding crowns and cryptands as ligands. U.S. Pat. No. 5,182,251 to Bruening et al. discloses aminoalkylphosphonic acid-containing hydrocarbons ligands. U.S. Pat. No. 4,960,882 to Bradshaw discloses proton-ionizable macrocyclic ligands. U.S. Pat. No. 5,078,978 to Tarbet et al. discloses pyridine-containing hydrocarbon ligands. U.S. Pat. No. 5,244,856 to Bruening et al. discloses polytetraalkylammonium and polytrialkylamine-containing hydrocarbon ligandsd. U.S. Pat. No. 5,173,470 to Bruening et al. discloses thiol and/or thioether-aralkyl nitrogen-containing hydrocarbon ligands. U.S. Pat. No. 5,190,661 to Bruening et al. discloses sulfur-containing hydrocarbon ligands also containing electron withdrawing groups. Copending application serial no. 08/058,437 filed May 7, 1993, discloses oxygen donor macrocycles, for example, ligands containing macrocyclic polyether cryptands, calixarenes, and spherands, multiarmed ethers and mixtures of these. All of these previous reports have involved binding of the ligands to solid inorganic supports via a silane-containing spacer grouping. However, researchers have not previously reported incorporating complex, strongly interacting and highly selective ion-binding ligands into membranes which would be highly desirable because of the high surface-to-area ratios, convenient physical formats, ease of production, ease of use, and inexpensive cost of such membranes. The present invention successfully accomplishes this feat.

SUMMARY OF THE INVENTION

The compositions of the present invention comprise ion-binding ligands that are covalently bonded to a membrane through an amide, ester, thioester, carbonyl or other suitable bond. Membranes that are inherently hydrophilic, or partially hydrophilic, and contain moieties appropriate for making these bonds are preferred. Such membranes include polyamides, such as nylon, and cellulosic materials, such as cellulose, regenerated cellulose, cellulose acetate, and nitrocellulose. If the membrane used does not contain reactive groups it may be modified or derivatized appropriately. Composite membranes are also useful. A composite membrane comprises a porous polymer membrane substrate and an insoluble, cross-linked coating deposited thereon. Representative suitable polymers forming the membrane substrate include fluorinated polymers including poly (tetrafluoroethylene) ("TEFLON"), polyvinylidene fluoride (PVDF), and the like; polyolefins such as polyethylene, ultra-high molecular weight polyethylene (UPE), polypropylene, polymethylpentene, and the like; polystyrene or substituted polystyrenes; polysulfones such as polysulfone, polyethersulfone, and the like; polyesters including polyethylene terephthalate, polybutylene terephthalate, and the like; polyacrylates and polycarbonates; and vinyl polymers such as polyvinyl chloride and polyacrylonitriles. Copolymers can also be used for forming the polymer membrane substrate, such as copolymers of butadiene and styrene, fluorinated ethylene-propylene copolymer, ethylene-chlorotrifluoroethylene copolymer, and the like.

With composite membranes, the substrate membrane material is not thought to affect the performance of the derivatized membrane and is limited in composition only by its ability to be coated, or have deposited on its surface, an insoluble polymer layer that contains the appropriate reactive group. This provides a hydrophilic layer which interacts well with water or other aqueous solutions. The end result is that when an organic ligand is attached to the surface of either a hydrophilic membrane or a composite membrane having a hydrophilic surface, the basic characteristics of any given ligand molecule are not changed by the process of attaching it to the surface or by the nature of the surface itself.

The coating of composite membranes comprises a polymerized cross-linked monomer. Representative suitable polymerizable monomers include hydroxyalkyl acrylates or methacrylates including 1-hydroxyprop-2-yl acrylate and 2-hydroprop-1-yl acrylate, hydroxypropylmethacrylate, 2,3-dihydroxypropyl acrylate, hydroxyethylacrylate, hydroxyethyl methacrylate, and the like, and mixtures thereof. Other polymerizable monomers that can be utilized include acrylic acid, 2-N,N-dimethylaminoethyl methacrylate, sulfoethylmethacrylate and the like, acrylamides, methacrylamides, ethacrylamides, and the like. Other types of hydrophilic coatings that can be used within the scope of the invention include epoxy functional groups such as glycidyl acrylate and methacrylate, primary amines such as aminoethyl methacrylates, and benzyl derivatives such as vinyl benzyl chloride, vinyl benzyl amine, and p-hydroxyvinyl benzene.

The coating of composite membranes also comprises a precipitated crystal system, such as that involving the material known under the trademark "NAFION." "NAFION" is a sulfonic acid or sodium sulfonate of a perfluorinated polyether.

The basic consideration in selecting a composite membrane is that the coating placed on the membrane substrate is the determining factor in defining the chemistry used to covalently attach the ligand. For example, a composite membrane displaying a carboxylic acid functional group can form an amide bond with a pendant amine group from the ligand, one of the most stable methods of ligand immobilization. The composite polymers referenced above can be prepared with carboxylic acid active groups that can be readily converted to amides upon reaction with an amine group on a ligand. However, any of the other organic species which are reactive toward an acid chloride could be used to attach an organic ligand to the surface. Additional examples of such groups would be esters, thioesters, Grignard reagents, and the like.

If the reactive group on the surface is a sulfonic acid, then an analogous procedure using a sulfonyl chloride would yield results similar to those obtained with carboxylic acid functionalities. One such polymer containing sulfonic acid reactive groups is available under the tradename "NAFION" from DuPont as described above.

The ligand is selected from the group consisting of amine-containing hydrocarbons, sulfur and nitrogen-containing hydrocarbons, sulfur-containing hydrocarbons, crowns and cryptands, aminoalkylphosphonic acid-containing hydrocarbons, polyalkylene-polyamine-polycarboxylic acid-containing hydrocarbons, proton-ionizable macrocycles, pyridine-containing hydrocarbons, polytetraalkylammonium and polytrialkylamine-containing hydrocarbons, thiol and/or thioether-aralkyl nitrogen-containing hydrocarbons, sulfur-containing hydrocarbons also containing electron withdrawing groups, and macrocyclic polyether cryptands, wherein the ligands are capable of selectively complexing ions such as either certain alkali, alkaline earth, noble metal, other transition metal, and post transition metal ions when contacted with solutions thereof when admixed with other ions.

The process for removing and concentrating certain selected ions using the ligand-membrane compositions is carried out in any manner that provides for bringing the ion to be removed into contact with the ligand affixed to the membrane. Overall the process comprises selectively removing and concentrating one or more selected species of ion from a plurality of other ions in a multiple ion solution in which the other ions may be present at much higher concentrations. The multiple ion solution or source solution is brought into contact with a composition of the present invention. The preferred embodiment disclosed herein involves carrying out the process by bringing a large volume of the multiple ion solution into contact with a composition of matter of the invention. Contact is preferably made in a contacting device comprising a cartridge containing the composition of matter of the invention by causing the multiple ion solution to flow through the cartridge and thus come in contact with the composition of the invention. However, various contact apparatus may be used instead of a cartridge. The selected ion or ions complex with the composition. Following the complexing step, a small volume of a receiving liquid or eluant is brought into contact with the loaded composition to break the complex by chemical or thermal means and to dissolve the selected ions and carry them away from the composition. The selected ions can then be recovered from the receiving liquid by well known procedures.

More particularly, the process comprises forming a complexing agent by covalent bonding of a ligand of the type mentioned previously to a composite membrane, such as one of those previously mentioned. The complexing agent is then introduced into a contacting device such as a cartridge. The solution containing the multiple ion species flows through the cartridge in contact with the complexing agent, whereby the selected ions complex with the complexing agent. The selected ions are thus separated from the rest of the ion mixture that flows out of the cartridge. A small volume of the receiving liquid or eluant is then passed through the cartridge to break the complex and dissolve and carry out of the cartridge the selected ion or ions. The selected ions are then recovered from the receiving phase by well known procedures.

DETAILED DESCRIPTION OF THE INVENTION

Preparation of the Ligand-Membrane Compositions

The compositions of the present invention may be prepared by any suitable method wherein the ligands can be covalently bonded to a membrane containing reactive functional groups.

The membrane is selected to yield both selected bulk properties and selected surface properties. For naturally hydrophilic membranes, the selected bulk and surface properties will be provided by whatever polymer that comprises the membrane. For composite membranes, the selected bulk properties will be provided by the membrane substrate and the selected surface properties will be provided by the coating. A composite membrane is formed by depositing a monomer directly on the surface of the substrate, including the inner surfaces of the pores, by in situ deposition of the cross-linked monomer. The desired deposition of the cross-linked monomer onto the porous substrate is effected as a direct coating and does not require or utilize an intermediate binding chemical moiety. Any monomer for the coating polymer can be used so long as it is capable of being polymerized by free radical polymerization and can be crosslinked. The only requirements of the polymerized monomer is that it is capable of coating the entire surface of the porous membrane, that it provide the surface with ligand-reactive functional groups, and that it be sufficiently hydrophilic to allow for efficient use of the ligand to be attached. Generally, the porous substrate has an average pore size between about 0.001 and 10 µm, and more usually, between about 0.1 and 5.0 µm. The composite membrane is formed by any suitable method, such as is disclosed in U.S. Pat. No. 4,618,533, which is hereby incorporated by reference. Briefly, this procedure involves washing the porous membrane substrate with a suitable solvent for wetting the entire surface of the substrate. The substrate is then bathed in a mixture of the free radical polymerizable monomer, a polymerization initiator, and a cross-linking agent in a solvent under conditions to effect free radical polymerization of the monomer and coating of the porous substrate with the cross-linked polymer. The surface of the coated polymer membrane contains hydrophilic or polar-substituents that can be activated to react with and covalently bond the ligands to the membrane surface.

The composite membranes prepared according to U.S. Pat. 4,618,533 can contain carboxylic acid moieties on the surface. Other suitable moieties could include hydroxyl, sulfonic acid, epoxy, primary amine, and derivatized benzyl groups such as polymers referenced above.

Preparation of a composite membrane by a precipitated crystal technique involves, briefly, washing the porous membrane substrate with a suitable solvent for wetting the entire surface of the substrate. The substrate is then bathed in a solution containing the crystals that are to be precipitated. This solution is then removed and the membrane substrate is treated with a compound that precipitates and fixes the crystals to the substrate. The membrane is washed and dried before use.

In the present invention, the activation of the carboxylic acid groups is exemplified by the reaction of the carboxylic acid groups with thionyl chloride to form acid chloride groups according to the formula:

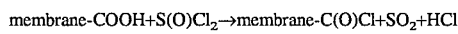

membrane-COOH+S(O)Cl$_2$→membrane-C(O)Cl+SO$_2$+HCl

Carboxylic acid groups also can be converted to acid chloride groups by reaction with phosphorus pentachloride or phosphorus trichloride.

Ligands (L) containing reactive amines, alcohols, thiols, Grignard reagents and the like may be covalently bonded to the membrane through the —C(O)Cl group as follows:

(1) membrane-C(O)Cl+H$_2$NL→membrane-C(O)NHL+ HCl (amide)

(2) membrane-C(O)Cl+HOL→membrane-C(O)OL+HCl (ester)

(3) membrane-C(O)Cl+HSL→membrane-C(O)SL+HCl (thioester)

(4) membrane-C(O)Cl+XMgL→membrane-C(O)L+ MgXCl (ketone)

In a similar manner, the activation of the sulfonic acid groups is exemplified by the reaction of the sulfonic acid groups with thionyl chloride to form sulfonyl chloride groups according to the formula:

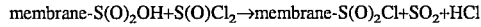

membrane-S(O)$_2$OH+S(O)Cl$_2$→membrane-S(O)$_2$Cl+SO$_2$+HCl

Sulfonyl chloride groups also can be obtained by reaction of sulfonic acid groups with phosphorus pentachloride or phosphorus trichloride.

Ligands containing reactive amines, alcohols and the like may be covalently bonded to the membrane through the —S(O)$_2$Cl group as follows:

(1) membrane-S(O)$_2$Cl+H$_2$NL→membrane-S(O)$_2$NHL+ HCl (sulfonamide)

(2) membrane-S(O)$_2$Cl+HOL→membrane-S(O)$_2$OL+ HCl (sulfonate ester)

This reaction does not proceed as readily as the reactions with acid chlorides formed from carboxylic acids. However, any reaction may be used provided it is functional to form a stable covalent bond between the ligand and the membrane. For the present, it has been found that the amide linkage is most stable and readily formed.

Ligands, which may be adapted to contain —NH$_2$, —OH, —SH, —MgX moieties which are reactive so as to form a covalent bond with membrane attached functionalities are illustrated in the patents indicated below, which are hereby incorporated by reference: amine-containing hydrocarbons (U.S. Pat. No. 4,952,321), sulfur and nitrogen-containing hydrocarbon ligands (U.S. Pat. Nos. 5,071,819 and 5,084, 430), sulfur-containing hydrocarbon ligands (U.S. Pat. Nos. 4,959,153 and 5,039,419), crowns and cryptand ligands (U.S. Pat. Nos. 4,943,375 and 5,179,213 ), aminoalkylphosphonic acid-containing hydrocarbon ligands (U.S. Pat. No. 5,182,251), proton-ionizable macrocycle ligands (U.S. Pat. No. 4,960,882), pyridine-containing hydrocarbon ligands (U.S. Pat. No. 5,078,978), polytetraalkylammonium and polytrialkylamine-containing hydrocarbon ligands (U.S. Pat. No. 5,244,856), thiol and/or thioether-aralkyl nitrogen-containing hydrocarbon ligands (U.S. Pat. No. 5,173,470), and sulfur and electron withdrawing group-containing hydrocarbon ligands (U.S. Pat. No. 5,190,661).

An oxygen donor macrocycle ligand, such as disclosed in copending application Ser. No. 08/058,437 filed May 7, 1993, having a reactive grouping attached, may be prepared by various reaction schemes. Two are illustrated. The first involves the reaction of a cis dihydroxy crown ether with a polyether diol wherein the diol groups have been activated by reaction with a "leaving" group such as tosyl chloride. The following reaction sequence (Reaction A) shows the formation of an oxygen donor macrocycle ligand (Formula 2) by means of reacting a cis dihydroxy crown ether (Formula 3) with a tosylated polyether diol (Formula 4) as follows wherein Ts stand for the tosyl group, $R_3$, $R_4$, $R_5$, and $R_6$ is each a member independently selected from the group consisting of H, allyloxymethyl, alkylthio, alkylamino, carboxy, carboxyalkyl, and epoxyalkyl. $R_7$ is a member selected from the group consisting of H and alkyl, Z is a member selected from the group consisting of o-phenylene and o-naphthalene or alkyl, $R_1$ and $R_2$ are each a member selected from the group consisting of H, allyl, alkenyl, carboxy, carboxyalkyl, allyloxy, aminoalkyl, hydroxy, thio, and alkylthio. The functional groups that are not directly reactive with the corresponding groups on the surface of the membrane must be further reacted so as to allow a covalent bond. As an example, a carboxy alkyl functional group could be converted to an acid chloride and further reacted with ethylene diamine (in large excess) to provide a mono amide with a free amine. This could then be reacted with the membrane. Further, n is an integer of 2 to 4, a is an integer of 0 or 1, b is an integer of 0 to 3 with the proviso that b must be at least 1 when a is 0, and m is an integer of 0 to 5. To provide a reactive grouping to react with a reactive membrane, it is mandatory that one or two, and preferably only one, of the $R_1$ through $R_6$ groups must be other than H. The remaining $R_1$ through $R_6$ groups are H.

REACTION A

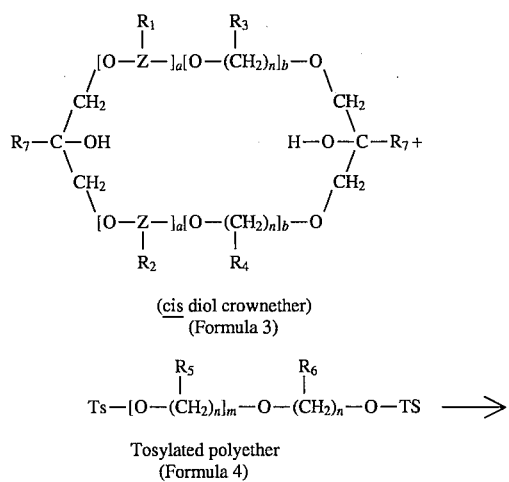

(cis diol crownether)
(Formula 3)

Tosylated polyether
(Formula 4)

-continued
REACTION A

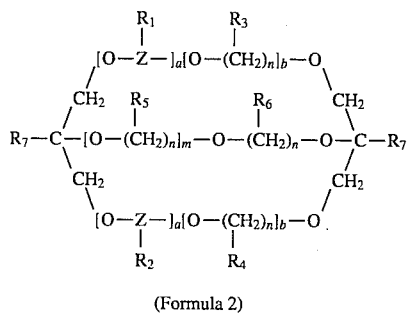

(Formula 2)

While the Ts or tosyl group is illustrated above, other leaving groups such as mesylates, chlorides, bromides and the like can also be utilized. The tosyl group is preferred because it is crystalline and has better reaction properties.

The second reaction scheme involves the reaction of a cis dibromomethyl crown ether with a polyether diol. The following reaction sequence (Reaction B) shows the formation of an oxygen donor macrocycle ligand (Formula 2) by means of reacting a cis dibromomethyl crown ether (Formula 5) with a polyether diol (Formula 6) as follows wherein symbols have the same meaning as given for Formula 2 above:

REACTION B

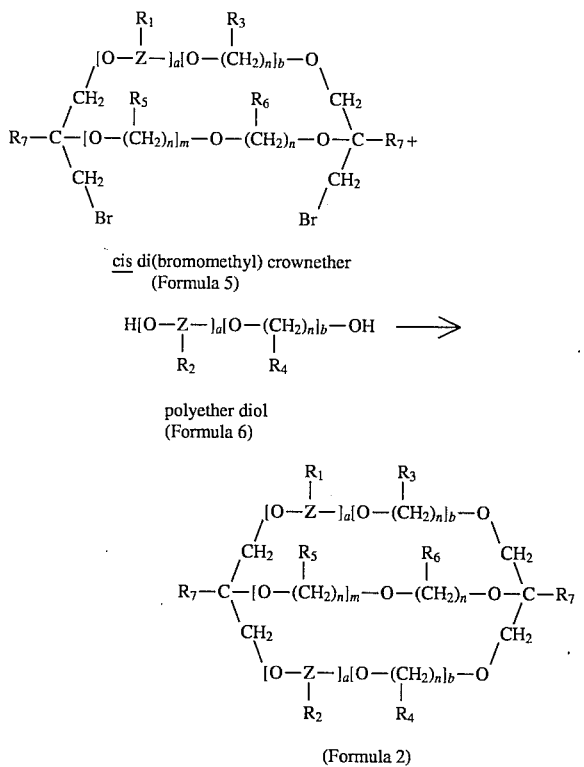

(Formula 2)

The compound corresponding to Formula 2, having a reactive grouping may then be reacted with a membrane derivatized with hydrophilic functionalities.

Polyalkylene-polyamine-polycarboxylic acid- containing hydrocarbon ligands may be prepared by various methods. For example, in one method the Polyalkylene-polyamine-polycarboxylic acid ligand is bound to the membrane. In a second method, a polyalkylenepolyamine is reacted with a membrane followed by reacting with a polycarboxylic acid.

The above described ligands have heretofore been attached to solid supports such as silica gel, silica, glass, glass fibers, nickel oxide, zirconia, alumina, titania and the like. The attachment of the ligand to the solid support has been by means of a silane spacer grouping. There are certain drawbacks to the use of such solid support. For example, they most often have to be contained in a column or similar structure and do not have the adaptability for other configurations that a membrane possesses. Further, silane chemistry is complicated and limits certain reactions or applications. Finally, the instability or even partial dissolution of the inorganic supports in some solution matrices makes their use in some separation applications poor or unacceptable. However, such ligands, that have been attached to the above mentioned inorganic solid supports, have not previously been affixed to membranes.

The novelty of the invention is in the membrane ligand combination and in the method of using such combinations in removing desired ions. Any Of the ligands previously used may be modified for use in the present invention. Because the ligands are not in and of themselves novel, they will be referred to as ligands ("L") and may be further designated by classes, i.e. amine-containing hydrocarbon ligands; sulfur and nitrogen-containing hydrocarbon ligands; sulfur-containing hydrocarbon ligands; crown and cryptand ligands; aminoalkylphosphonic acid-containing hydrocarbon ligands; proton-ionizable macrocycle ligands; pyridine-containing hydrocarbon ligands; polytetraalkylammonium and polytrialkylamine-containing hydrocarbon ligands; thiol and/or thioether-aralkyl nitrogen-containing hydrocarbon ligands; sulfur and electron withdrawing group-containing hydrocarbon ligand; and oxygen donor macrocycle ligands. This listing of ligands is exemplary only and is not intended to be all encompassing. Other ligands, known or yet to be developed, may also be utilized with the only limitation being that they can be covalently attached to the membrane and are functional in the selective attracting and binding of the selected ions being removed from the solutions being treated.

The membrane ligand combination of the invention can therefore be defined by the formula:

$$M—B—L$$

wherein M is any membrane or composite membrane derivatized to have a hydrophilic surface and contain polar functional groups, L is any ligand as defined above containing a functional grouping reactive with an activated polar group from the membrane and B is the covalent linkage formed by the reaction between the activated polar group and the functional group of the ligand. Representative of B linkages are members selected from the group consisting of amide (NHCO), ester (COO), thioester (COS), carbonyl (CO), ether (O), thioether (S), and sulfonamide ($SO_2NH$).

The membrane/ligand compositions of the present invention that are useful for separating selected ions will be apparent to those skilled in the art by the following examples each of which utilizes a composite membrane prepared according to U.S. Pat. 4,618,533 and containing carboxylic acid groups or sulfonic acid groups.

EXAMPLE 1

In this example, a nitrogen-containing ligand derivatized membrane was prepared according to the following procedure. A 3×3 inch piece of polytetrafluoroethylene (PTFE) ("TEFLON") membrane coated by the method of U.S. Pat.

No. 4,618,533 with crosslinked acrylic acid containing carboxylic acid functional groups immobilized on the surface was immersed in enough thionyl chloride to completely cover the surface of the membrane. The membrane remained covered by this solution for 8–14 hours to enable the thionyl chloride to react with and convert the carboxylic acid groups to acid chlorides. The activated membrane was then removed and washed thoroughly with hexane. Other organic solvents, such as toluene, would work equally well. The activated membrane was then placed in a flask containing a solution composed of 3 g of pentaethylenehexamine ligand and enough toluene to be sure the membrane was completely covered by the mixture. This mixture was allowed to react for 8–14 hours to form an amide bond between one of the amine groups of the ligand and the acid chloride group of the membrane. The membrane was again washed with organic solvent to remove unbound ligand and permitted to air dry in a well-ventilated hood. After the membrane was dried it was tested to determine its ion binding properties. Testing results are shown in Example 14.

EXAMPLE 2

In this example, a 3×3 inch piece of polyvinylidene fluoride (PVDF) membrane coated by the method of U.S. Pat. No. 4,618,533 with crosslinked acrylic acid containing carboxylic acid functional groups was converted to the acid chloride form and then derivatized with pentaethylenehexamine as in Example 1.

In Examples 3–12 which follow the carboxylic acid derivatized PTFE composite membrane of Example 1 was utilized for ligand attachment. However, the PVDF composite membrane of Example 2 could have been used with similar results. When testing the separation properties of ligands affixed to composite membranes of both Examples 1 and 2, the results were substantially the same.

EXAMPLE 3

In this example, a nitrogen and sulfur-containing ligand derivatized membrane was prepared according to the following procedure. A 3×3 inch square of carboxylic acid group containing PTFE composite membrane was prepared and treated with thionyl chloride as in Example 1. This material was then reacted with pentaethylenehexamine as a first step to attach the amine via an amide bond to the membrane. This intermediate product was then washed, and immersed in a second solution containing toluene and 1 g of ethylene sulfide to provide the ligand with a —$NHCH_2CH_2SH$ grouping. Again, it was necessary to ensure that the solution covered the membrane at all times. The reaction times for each step are from 8–14 hours. After the membrane was dried, it was tested for ion complexation properties as shown in Example 15.

EXAMPLE 4

In this example, a nitrogen and sulfur-containing ligand derivatized membrane was prepared according to the following procedure. A 3×3 inch square of carboxylic acid group containing PTFE composite membrane was treated with thionyl chloride as in Example 1. This material was then reacted with ethylene diamine instead of pentaethylenehexamine as in Example 3. The result of this reaction is a material that is bonded to the membrane via an amide linkage and contains one free amino group that is then further reacted with a solution containing toluene and ethylene sulfide as in Example 3. After the membrane was dried, it was tested for ion complexation properties as shown in Example 16.

EXAMPLE 5

In this example, a sulfur-containing ligand derivatized membrane was prepared according to the following procedure. The carboxylic acid group containing PTFE composite membrane was prepared as in Example 4 so that the carboxylic acid groups were converted to the acid chloride form. The membrane was then immersed in a solution containing toluene and the reaction product of ethanedithiol and one equivalent of 2-methyl aziridine to immobilize a —$CONHCH_2CH(CH_3)SCH_2CH_2SH$ ligand on the membrane. The free SH group was then blocked with a methanol solution containing methyl iodide and sodium carbonate. After the membrane was dried, it was tested for ion complexation properties as shown in Example 17.

EXAMPLE 6

In this example, a crown ether containing ligand was prepared and attached to a membrane according to the following procedure. The acid chloride form of the carboxylic acid group containing PTFE composite membrane was prepared as in Example 1. The crown was prepared for attachment by taking 2 g of allyloxymethyl-18-crown-6 and dissolving it in either dichloromethane or benzene. The double bond of the allyl group was then converted into the epoxide by adding hydrogen peroxide (1 to 2 small drops of a 30% solution) to the stirring mixture. Ammonium hydroxide (0.2 g) was then added to the epoxidized crown and the temperature was raised to between 30° C. and 60° C. The reaction was allowed to proceed for 6–14 hours to form a ligand comprising 18-crown-6 containing a —$CH_2OCH_2CH(OH)CH_2NH_2$ grouping. This ligand-containing reaction mixture was added to a toluene solution containing the membrane. This procedure resulted in the 18-crown-6 being attached via an amide linkage and can also be used to attach a wide variety of other macrocyclic compounds, or starting materials containing double bonds. After the membrane was dried, it was tested for ion complexation properties as shown in Example 18.

EXAMPLE 7

In this example, an aminophosphonic acid-containing ligand derivatized membrane was prepared according to the following procedure. A 3×3 inch square of carboxylic acid group containing PTFE composite membrane was treated with thionyl chloride and ethylene diamine as in Example 4. The resulting amino-amide was further reacted by placing the membrane into a 3-necked round bottom flask containing 83 ml concentrated HCl, 83 ml water, and 70 g of phosphorous acid. The mixture was heated to reflux, and 270 ml of formaldehyde was slowly added over a period of 1 hour. The mixture was refluxed for 1 to 4 additional hours resulting in a ligand attached via an amide linkage comprising the grouping $CONHCH_2CH_2N(CH_2PO(OH)_2)_2$. This product was washed with water, and dried. This product was then tested for its ion complexation properties as shown in Example 19.

EXAMPLE 8

In this example, the procedure of Example 7 was followed with the exception that pentaethylenehexamine was substituted for ethylene diamine, with the volumes of reagents being adjusted in accordance with this substitution. This results in a ligand comprising the grouping —CONH(CH$_2$CH$_2$NH)$_5$CH$_2$PO(OH)$_2$. This product was then tested for its ion complexation properties as shown in Example 20.

EXAMPLE 9

In this example, a nitrogen-containing ligand derivatized membrane was prepared according to the following procedure. A 3×3 inch piece of PTFE composite membrane with carboxylic acid groups on the surface according to Example 1 was converted to the acid chloride form and reacted with tetraaza-12-crown-4 in toluene with the resultant formation of an amide bond between one of the ring nitrogen atoms and the acid chloride. The resulting membrane was washed 4 times with toluene and then treated with concentrated HCl, phosphorous acid, and formaldehyde as in Example 7 to produce a membrane with a macrocyclic aminoalkylphosphonic pendent group. This material was then tested for ion complexing properties as shown in Example 21.

EXAMPLE 10

In this example, an aminocarboxylic acid-containing membrane was prepared according to the following procedure. The material was prepared as in Example 7 up to the point of having ethylene diamine attached to the surface via an amide linkage. This material was further reacted by placing the membrane into a flask containing 200 ml dimethylformamide (DMF), 0.1 g dimethylaminopyridine (DMAP), 25 ml pyridine, and 1 g of diethylenetriaminepentaacetic acid (DTPA) dianhydride. The mixture was allowed to react at 80° C. for 24–72 hours. The final product was washed with water, dried, and tested for ion binding properties as shown in Example 22.

EXAMPLE 11

In this example, a nitrogen-containing cryptand was attached to a carboxylic acid group containing PTFE composite membrane according to the following procedure. The procedure for producing a membrane with cryptand 2.2.2 attached thereto was identical to the procedure used in Example 6 except that allyloxymethyl-cryptand-2.2.2 was used in place of 18-crown-6. After the membrane was dried, it was tested for ion complexation properties as shown in Example 23.

EXAMPLE 12

In this example, a nitrogen-containing crown was attached to a membrane according to the following procedure. An acid chloride form of the carboxylic acid group containing PTFE composite membrane was prepared as in Example 1. Hexaza-18-crown-6 dissolved in toluene was then allowed to react with the membrane for 8–14 hours as in Example 9. The membrane was washed with toluene and dried before testing the ion removal properties as shown in Example 24.

EXAMPLE 13

In this example, an ultra-high molecular weight polyethylene (UPE) membrane was coated with "NAFION" by a precipitated crystal technique to yield a membrane having sulfonic acid reactive groups on the surface, and then a nitrogen-containing ligand-derivatized membrane was prepared.

Pieces (2×12 inches, 3×3 inches, or 2.75 cm diameter discs) of UPE membrane were rinsed three times each with 150 ml of HPLC grade isopropanol and then three time each with 150 ml of HPLC grade methanol. The membranes were then air dried until they reach a constant weight. The membranes were then pre-wet in methanol and soaked in 50 ml of "NAFION" Solution (sulfonic acid or sodium sulfonate of perfluorinated polyether ion exchange powder in lower aliphatic alcohols and 10% water, 5 wt. % solution, Aldrich Chemical Co.) for about 5 minutes. The "NAFION" Solution was then decanted and the membranes were bathed in methylene chloride. The membranes were then rinsed three times each in 150 ml of methylene chloride, air dried for 2 hours, and dried under vacuum overnight (15 hours).

The sulfonic acid groups on the membrane were converted to the sulfonyl chloride form by reaction with phosphorus pentachloride, analogous to forming an acid chloride from a carboxylic acid as in Example 1, to result in an activated membrane. Thus, a 2×12 inch, 3×3 inch, or 2.75 cm diameter piece of "NAFION"-coated UPE membrane was immersed in enough phosphorus pentachloride solution to completely cover the surface of the membrane. The membrane remained immersed for 8–14 hours to enable the phosphorus pentachloride to convert the sulfonic acid groups to sulfonyl chloride groups. This activated membrane containing sulfonyl chloride groups was then removed from the phosphorus pentachloride solution and washed thoroughly in hexane or toluene. The activated membrane was then placed in a flask containing a solution of 3 g of pentaethylenehexamine ligand and enough toluene to ensure complete coverage of the membrane. This mixture was allowed to react for 8–14 hours to form a sulfonamide bond between one of the amine groups of the ligand and a sulfonyl chloride group of the activated membrane. The membrane was again washed with organic solvent to remove unbound ligand and permitted to air dry.

Other ligand derivatized membranes can also be prepared by following the above guidelines. Also ligands may be attached to sulfonic acid derivatized membranes in the manner described above through the formation of sulfonamide or sulfonate ester bonds.

Metal Ion Recovery and Concentration

The metal ion recovery and concentration process of the invention relates to the selective recovery of selected metal ions from mixtures thereof with other metal ions using the compositions of the invention as defined above. Effective methods of recovery and/or separation of metal ions from culinary water supplies, high purity fluids, waste solutions, deposits and industrial solutions and metal recovery from waste solutions, e.g., from emulsions on photographic and X-ray films, represent a real need in modern technology. These ions are typically present at low concentrations in solutions containing other ions at much greater concentrations. Hence, there is a real need for a process to selectively recover and concentrate these undesirable hazardous and/or desirable ions. The present invention accomplishes this separation effectively and efficiently by the use of ligands bonded to membranes in accordance with the present invention.

The general method for selectively recovering and concentrating metal ions from solutions of mixed ions involves complexing selected ions in a source solution with a composition of the present invention and then breaking the complex to liberate the complexed ions and dissolving the liberated ions in a receiving liquid in a much smaller volume than the volume of the source solution. As used herein, "source solution," "loading solution," and the like means a solution containing a mixture of an ion or ions that are selected to be concentrated, separated, and/or recovered together with other ions and complexing or chemical agents that are not selected to be removed but which are present in much greater concentrations in the solution. As used herein, "receiving solution," "stripping solution," "elution solution," "eluant," and the like means an aqueous solution that has greater affinity for the ions that are to be concentrated, separated, and/or recovered, or in which such ions are soluble. In either event, the selected ions are quantitatively stripped from the ligand in concentrated form in the receiving solution, because the receiving solution will ordinarily have a much smiler volume than the source solution.

The method of using the membrane/ligand compositions of the present invention for separating selected ions from solutions will be apparent to those skilled in the art upon examination of the following illustrative examples.

EXAMPLE 14

A 0.2 g sheet of the membrane of Example 1 was placed in a beaker containing 25 ml of $5\times10^{-4}$M $CuCl_2$ in 1M sodium acetate and 0.1M acetic acid (pH=5.5). The membrane was contacted with this source solution for 120 minutes. The membrane was then removed from the source solution, rinsed with water, and placed in 5 ml of receiving solution consisting of 1M HCl.

The source and receiving solutions were analyzed before and after contact with the membrane for copper and sodium using flame atomic absorption (AA) spectroscopy. Initially, the source solution contained 23 g/l sodium and 31 ppm copper, but after contact with the membrane it contained 23 g/l sodium and about 1 ppm copper.

The receiving solution initially contained copper and sodium levels below the level of detection, but after contact with the membrane contained an undetectable amount of sodium and 154 ppm copper. This example shows that the membrane-ligand separation was highly selective for copper over sodium, that copper was readily removed from the source solution by contact with the membrane, and that the copper ions could be recovered in a small volume of receiving solution. It is expected that concentration of copper ions in the receiving solution would be even greater when larger volumes of source solution and larger membranes are used.

EXAMPLE 15

A 0.2 g sheet of the membrane of Example 3 was placed in a beaker containing 25 ml of $5\times10^{-4}$M $Hg(NO_3)_2$, 0.1M $Ca(NO_3)_2$, and 0.5M $NaNO_3$. The membrane was contacted with this source solution for 120 minutes. The membrane was then removed from the source solution, rinsed with water, and placed in 5 ml of a receiving solution consisting of 0.5M thiourea, 0.1M $HNO_3$.

The source and receiving solutions were analyzed before and after contact with the membrane for the presence of mercury using inductively coupled plasma (ICP) spectroscopy and for the presence of calcium and sodium using flame atomic absorption (AA) spectroscopy. Initially, the source solution contained 4 g/l calcium, 12.5 g/l sodium, and 101 ppm mercury. After contact with the membrane, the source solution contained 4 g/l calcium, 12.5 g/l sodium, and <1 ppm mercury.

The receiving solution initially contained calcium, sodium, and mercury levels below the level of detection. After contact with the membrane, this solution contained calcium and sodium at levels below the level of detection and mercury at 505 ppm. Thus, mercury was separated from the source solution also containing sodium and calcium with a high degree of selectivity. The mercury was readily removed from the source solution containing a mixture of ions, and the mercury was recovered and concentrated by elution in a simple receiving solution. As with Example 14, it is expected that the concentration factor can be improved with a system operating on a larger scale, particularly with the membrane engineered in cartridge form.

EXAMPLE 16

A 0.2 g sheet of the membrane of Example 4 was placed in a beaker containing 25 ml of $5\times10^{-4}$M $AgNO_3$, 0.1M $Fe(NO_3)_3$, and 0.1M $NaNO_3$. The membrane was contacted with this source solution for 120 minutes. The membrane was then removed from the source solution, rinsed with water, and placed in 5 ml of a receiving solution consisting of 6M HCl.

The source and receiving solutions were analyzed before and after contact with the membrane for the presence of silver, iron, and sodium using flame AA spectroscopy. Initially, the source solution contained 5.6 g/l iron, 12.5 g/l sodium, and 54 ppm silver. After contact with the membrane, the source solution contained 5.6 g/l iron, 12.5 g/l sodium, and <1 ppm silver.

The receiving solution initially contained iron, sodium, and silver levels below the level of detection. After contact with the membrane, however, the receiving solution contained undetectable levels of iron and sodium and 265 ppm silver. The membrane-ligand combination was highly selective for removing silver ions from a source solution of mixed ions. The silver ions thus could be recovered and concentrated in purified form.

EXAMPLE 17

A 0.2 g sheet of the membrane of Example 5 was placed in a beaker containing 25 ml of $5\times10^{-4}$M $PdCl_2$ in 6M HCl, 0.1M $NiCl_2$, 0.1M $FeCl_3$, and 0.1M $ZnCl_2$. The membrane was contacted with this source solution for 120 minutes. The membrane was then removed from the source solution, rinsed in water, and placed in 5 ml of a receiving solution consisting of 2M $NH_3$ and 1M HCl.

The source and receiving solutions were analyzed before and after contact with the membrane for palladium, nickel, and zinc using ICP spectroscopy. Initially, the source solution contained 5.9 g/l nickel, 5.6 g/l iron, 6.5 g/l zinc, and 52 ppm palladium. After contact with the membrane, the source solution contained 5.9 g/l nickel, 5.6 g/l iron, 6.5 g/l zinc, and <1 ppm palladium.

The receiving solution initially contained nickel, iron, zinc, and palladium at levels below the level of detection. After contact with the membrane, however, the receiving solution contained undetectable levels of nickel, iron, and zinc, but contained 262 ppm palladium. Thus, the membrane-ligand combination was highly selective for binding palladium ions from a source solution containing a mixture of ions, and permitted removal, purification, and recovery of the palladium ions.

EXAMPLE 18

A 0.2 g sheet of the membrane of Example 6 was placed in a beaker containing 25 ml of $5\times10^{-4}$M $Pb(NO_3)_2$ in 1M HNO$_3$, 0.1M Mg(NO$_3$)$_2$, and 0.1M Ca(NO$_3$)$_2$. The membrane was contacted with this source solution for 120 minutes. The membrane was then removed from the source solution, rinsed with water, and placed in 5 ml of a receiving solution consisting of 0.03M tetrasodium EDTA.

The source and receiving solutions were analyzed before and after contact with the membrane for the presence of lead, magnesium, and calcium using flame AA spectroscopy. Initially, the source solution contained 2.4 g/l magnesium, 4.0 g/l calcium, and 102 ppm lead. After contact with the membrane, the source solution contained 2.4 g/l magnesium, 4.0 g/l calcium, and about 2 ppm lead.

The receiving solution initially contained magnesium, calcium, and lead at levels below the level of detection. After contact with the membrane, the receiving solution contained undetectable levels of magnesium and calcium and 495 ppm lead. Thus, the membrane-ligand combination was highly selective in removing lead ions from a source solution containing a mixture of ions and permitted recovery and concentration of relatively pure lead.

EXAMPLE 19

A 0.2 g sheet of the membrane of Example 7 was placed in a beaker containing 25 ml of 5×10$^{-4}$M Sb in 2M H$_2$SO$_4$, 0.3M CuSO$_4$, and 0.1 M NiSO$_4$. The membrane was contacted with this source solution for 120 minutes. The membrane was then removed from the source solution, rinsed in water, and placed in 5 ml of a receiving solution consisting of 6M HCl.

The source and receiving solutions were analyzed before and after contact with the membrane for copper, nickel, and antimony using flame AA spectroscopy. Initially, the source solution contained 5.9 g/l nickel, 19 g/l copper, and 56 ppm antimony. After contact with the membrane, the source solution contained 5.9 g/l nickel, 19 g/l copper, and <5 ppm antimony.

The receiving solution initially contained nickel, copper, and antimony at levels below the level of detection. After contact with the membrane, however, the receiving solution contained undetectable levels of nickel and copper, but contained 285 ppm antimony. Thus, the membrane-ligand combination was selective for binding antimony from a source solution containing a mixture of ions, and permitted removal, purification, and recovery of the antimony.

EXAMPLE 20

A 0.2 g sheet of the membrane of Example 8 was placed in a beaker containing 25 ml of 5 ppm iron, 5 ppm lead, 5 ppm copper, 5 ppm nickel, and 5 ppm zinc in tap water. Tap water contains relatively high concentrations of sodium, potassium, calcium, and magnesium ions. The membrane was contacted with this source solution for 240 minutes. The membrane was then removed from the source solution, rinsed in water, and placed in 5 ml of a receiving solution consisting of 6M HCl.

The source and receiving solutions were analyzed before and after contact with the membrane for iron, nickel, and zinc using ICP spectroscopy and for copper and lead using flame AA spectroscopy. Initially, the source solution contained the levels of each metal as mentioned above. After contact with the membrane, the source solution contained <1 ppm of each of the metals.

The receiving solution initially contained iron, lead, nickel, copper, and zinc at levels below the level of detection. After contact with the membrane, however, the receiving solution contained 25 ppm nickel, 25 ppm copper, 24 ppm iron, 26 ppm lead, and 26 ppm zinc. Thus, the membrane-ligand combination readily removed iron, lead, copper, nickel, and zinc from a source solution containing a mixture of ions despite the presence of sodium, potassium, calcium, and magnesium ions in the source solution.

EXAMPLE 21

A 0.2 g sheet of the membrane of Example 9 was placed in a beaker containing 25 ml of 200 ppb iron in 1% HF. The membrane was contacted with this source solution for 480 minutes. The membrane was then removed from the source solution, rinsed in water, and placed in 5 ml of a receiving solution consisting of 37% HCl.

The source and receiving solutions were analyzed before and after contact with the membrane for iron using graphite furnace AA spectroscopy. Initially, the source solution contained 200 ppb iron. After contact with the membrane, the source solution contained 10 ppb iron.

The receiving solution initially contained iron at a level below the level of detection. After contact with the membrane, however, the receiving solution contained 910 ppb iron. Thus, the membrane-ligand combination readily removed iron from the source solution despite the very low level of iron in the source solution and the presence of both acid and the strongly iron-chelating fluoride.

EXAMPLE 22

A 0.2 g sheet of the membrane of Example 10 was placed in a beaker containing 25 ml of 10 ppm iron, 10 ppm copper, and 10 ppm nickel in 0.5M HF and 0.5M NaF. The membrane was contacted with this source solution for 240 minutes. The membrane was then removed from the source solution, rinsed in water, and placed in 5 ml of a receiving solution consisting of 3M HCl.

The source and receiving solutions were analyzed before and after contact with the membrane for iron and nickel using ICP spectroscopy and for copper using flame AA spectroscopy. Initially, the source solution contained 10 ppm each of iron, copper, and nickel. After contact with the membrane, the source solution contained <1 ppm of each of the three metals.

The receiving solution initially contained iron, copper, nickel, and sodium at levels below the level of detection. After contact with the membrane, however, the receiving solution contained sodium at a level below the level of detection and 50 ppm each of iron, copper, and nickel. Thus, the membrane-ligand combination readily removed iron, copper, and nickel from the source solution, and these three metals could be separated from the source solution and recovered.

EXAMPLE 23

A 0.2 g sheet of the membrane of example 11 was placed in a beaker containing 25 ml of 5 ppm potassium in deionized distilled water at pH 8. The membrane was contacted with this source solution for 120 minutes. The membrane was then removed from the source solution, rinsed in water, and placed in 5 ml of a receiving solution consisting of 0.1M HCl.

The source and receiving solutions were analyzed before and after contact with the membrane for potassium using flame AA spectroscopy. Initially, the source solution contained 15 ppm potassium, but after contact with the membrane it contained <1 ppm of potassium.

The receiving solution contained potassium at a level below the level of detection, but after contact with the membrane contained 75 ppm potassium. Thus, potassium could be readily removed from the source solution by binding to the membrane and recovered by elution in a receiving solution.

EXAMPLE 24

A 0.2 g sheet of the membrane of example 12 was placed in a beaker containing 25 ml of 5 ppm of each of lead, cadmium, mercury, copper, and nickel in tap water. The membrane was contacted with this source solution for 480 minutes. The membrane was then removed from the source solution, rinsed with water, and placed in 5 ml of a receiving solution consisting of 6M HCl.

The source and receiving solutions were analyzed before and after contact with the membrane for mercury, cadmium, and nickel using ICP spectroscopy, and for lead, copper and mercury using flame AA spectroscopy. Initially, the source solution contained 5 ppm of each of lead, cadmium, mercury, copper, and nickel, but after contact with the membrane it contained <1 ppm of each of these elements.

The receiving solution initially contained lead, cadmium, mercury, copper, and nickel at levels below the level of detection. After contact with the membrane, however, the receiving solution contained 25 ppm of each of the elements. Hence, lead, cadmium, mercury, copper, and nickel were all readily removed from a source solution also containing sodium, potassium, calcium, and magnesium. Further, all of the elements removed from the solution by adsorption to the membrane were recovered and concentrated in the receiving solution.

EXAMPLE 25

A 0.04 g sheet (2.75 cm diameter disc) of the membrane of Example 13 was placed in a membrane holder (O-ring and clamp). This arrangement allowed for a 1.83 cm diameter portion of the disc to be in contact with a solution flowing through the membrane. A 5 ml source solution containing 6 ppm Cu in 1M $Zn(NO_3)_2$, 0.1M sodium acetate, and 0.01M acetic acid was passed through the membrane using vacuum suction from a vacuum pump at a flow rate of 1 ml/min. The membrane was then washed by flowing 2 ml of 1M $NH_4Cl$ through the membrane at 1 ml/min. Next, 3 ml of a receiving solution comprising 0.5M HCl was passed through the membrane at a flow rate of 2 ml/min.

The source and receiving solutions were analyzed before and after they were passed through the membrane for copper, zinc, and sodium using flame atomic absorption spectroscopy. Initially, the source solution contained 6 ppm Cu, 65 g/l Zn, and 2.3 g/l Na. After contact with the membrane, the Zn and Na levels in the source solution were unchanged, and the Cu level was 2 ppm.

The receiving solution initially contained Cu, Zn, and Na at levels below the level of detection. After passing through the membrane, however, the receiving solution contained undetectable levels of Zn and Na, but contained 10 ppm Cu. Thus, the membrane-ligand combination was highly selective for the Cu at low levels in a source solution containing concentrated Zn and Na.

From the foregoing, it will be appreciated that the ligand-membrane compositions of the present invention provide a material useful for separation, recovery, and concentration of selected metal ions from mixtures of those ions with other ions, even when those other ions are in far greater concentrations. The recovered metals can then be analyzed or further concentrated from the receiving solution by standard techniques known in the technology of these materials.

Although the process of separating and concentrating certain metal ions in this invention has been described and illustrated by reference to certain specific membrane-bound ligands, processes using analogs of these ligands are within the scope of the processes of the invention as defined in the following claims.

We claim:

1. A method for concentrating, removing, and separating selected ions from a source solution comprising the steps of:

(a) contacting said source solution having a first volume with a composition comprising an ion-binding ligand having an affinity for the selected ions which is covalently bonded to a membrane said membrane ligand combination represented by the formula:

M-B-L wherein M is any membrane having hydrophilic surface properties and containing polar functional groups, L is any ligand having an affinity for the selected ions containing a functional grouping reactive with an activated polar group from the membrane and B is the covalent linkage formed by the reaction between the activated polar group of the membrane and the functional group of the ligand wherein said ligand portion of the composition has an affinity for said selected ions such as to form a complex between said selected ions and said ligand portion of said composition;

(b) removing the source solution from contact with said composition to which said selected ions have been complexed; and (c) contacting said composition having said selected ions complexed thereto with a smaller volume of an aqueous receiving solution in which said selected ions are either soluble or which has greater affinity for such selected ions than does the ligand portion of the composition thereby quantitatively stripping such selected ions from the ligand and recovering said selected ions in concentrated form in said receiving solution.

2. The method according to claim 1 wherein L is a ligand member selected from the group consisting of amine-containing hydrocarbons; sulfur and nitrogen-containing hydrocarbons; sulfur-containing hydrocarbons; crowns and cryptands; aminoalkylphosphonic acid-containing hydrocarbons; proton-ionizable macrocycles; pyridine-containing hydrocarbons; polytetraalkylammonium and polytrialkylamine-containing hydrocarbons; thiol and/or thioether-aralkyl nitrogen-containing hydrocarbons; sulfur and electron withdrawing group-containing hydrocarbons; and oxygen donor macrocycles.

3. The method according to claim 2 wherein B is a covalent linkage selected from the group consisting of amide (NHCO), ester (COO), thioester (COS), carbonyl (CO), ether (O), thioether (S), sulfonate ($SO_3$), and sulfonamide ($SO_2NH$) linkages.

4. The method according to claim 3 wherein M is a membrane selected from the group consisting of polyamides and cellulosics.

5. The method according to claim 4 wherein said membrane is a polyamide comprising nylon.

6. The method according to claim 4 wherein said membrane is a cellulosic selected from the group consisting of cellulose, regenerated cellulose, cellulose acetate, and nitrocellulose.

7. The method according to claim 3 wherein M is a composite membrane comprising a membrane substrate formed of a first polymer, said substrate being directly coated on its entire surface with a second polymer by a precipitated crystal technique and having a hydrophilic surface.

8. The method according to claim 7 wherein said first polymer is a polymer or copolymer of a member selected from the group consisting of fluorinated polymers, polyolefins, polystyrenes, polysulfones, polyesters, polyacrylates, polycarbonates, vinyl polymers, and polyacrylonitriles.

9. The method according to claim 8 wherein said second polymer is a perfluorinated polyether.

10. The method according to claim 3 wherein M is a composite membrane comprising a membrane substrate formed of a first polymer, said substrate being directly coated on its entire surface with a cross-linked second polymer formed from a monomer polymerized in situ and cross-linked in situ on said substrate and having a hydrophilic surface.

11. The method according to claim 10 wherein said first polymer is a polymer or copolymer of a member selected from the group consisting of fluorinated polymers; polyolefins; polystyrenes; polysulfones; polyesters; polyacrylates; polycarbonates; vinyl polymers; and polyacrylonitriles.

12. The method of claim 11 wherein said second polymer is formed from a polymerizable monomer selected from the group consisting of acrylates, methacrylates, ethacrylates, acrylic acid, acrylamides, methacrylamides, ethacrylamides and mixtures thereof.

13. The method of claim 12 wherein L is an amine-containing hydrocarbon ligand.

14. The method of claim 12 wherein L is a sulfur and nitrogen-containing hydrocarbon ligand.

15. The method of claim 12 wherein L is a sulfur-containing hydrocarbon ligand.

16. The method of claim 12 wherein L is a crown ligand.

17. The method of claim 12 wherein L is a cryptand ligand.

18. The method of claim 12 wherein L is an aminoalkylphosphonic acid-containing hydrocarbon ligand.

19. The method of claim 12 wherein L is a proton-ionizable macrocycle ligand.

20. The method of claim 12 wherein L is a pyridine-containing hydrocarbon ligand.

21. The method of claim 12 wherein L is a polytetraalkylammonium and polytrialkylamine-containing hydrocarbon ligand.

22. The method of claim 12 wherein L is a member selected from the group consisting of a thiol-aralkyl nitrogen-containing hydrocarbon ligand and a thioether-aralkyl nitrogen-containing hydrocarbon ligand.

23. The method of claim 12 wherein L is a sulfur and electron withdrawing group-containing hydrocarbon ligand.

24. The method of claim 12 wherein L is an oxygen donor macrocycle ligand.

25. The method of claim 12 wherein B is an amide linkage.

26. The method of claim 3 wherein B is a sulfonamide linkage.

27. The method of claim 1 wherein said composition is contained in a contacting device for holding said composition, wherein said contacting device includes means for flowing a source solution and a receiving solution past said composition.

28. The method of claim 27 wherein said contacting device comprises cartridge means.

* * * * *